United States Patent [19]
Wright et al.

[11] Patent Number: 5,844,192
[45] Date of Patent: Dec. 1, 1998

[54] THERMAL SPRAY COATING METHOD AND APPARATUS

[75] Inventors: Robert J. Wright, Tequesta; William J. Dalzell, Jr., Jupiter; George Himich, Jr., West Palm Beach; Raymond M. O'Donoghue, Coral Springs, all of Fla.

[73] Assignee: United Technologies Corporation, Hartford, Conn.

[21] Appl. No.: 644,060

[22] Filed: May 9, 1996

[51] Int. Cl.$^6$ .................................................. B23K 10/00
[52] U.S. Cl. .............................. 219/76.16; 219/121.47; 219/121.52; 427/446
[58] Field of Search .................. 219/121.47, 121.43, 219/121.52, 121.59, 76.16, 76.15, 651; 315/111.51; 427/535, 569, 446

[56] References Cited

U.S. PATENT DOCUMENTS

| | | | |
|---|---|---|---|
| 2,874,265 | 2/1959 | Reed et al. | 219/121 |
| 3,130,292 | 4/1964 | Gage et al. | 219/75 |
| 3,277,265 | 10/1966 | Reboux | 219/10.49 |
| 3,763,392 | 10/1973 | Hollister | 315/248 |
| 3,839,618 | 10/1974 | Muehlberger | 219/76.16 |
| 3,892,882 | 7/1975 | Guest et al. | 427/34 |
| 4,311,897 | 1/1982 | Yerushalmy | 219/121 PP |
| 4,386,258 | 5/1983 | Akashi et al. | 219/121 PM |
| 4,481,636 | 11/1984 | Curr et al. | 373/18 |
| 4,576,828 | 3/1986 | Walker, Jr. | 427/34 |
| 4,741,286 | 5/1988 | Itoh et al. | 118/620 |
| 4,801,435 | 1/1989 | Tylko | 422/186.04 |
| 4,902,870 | 2/1990 | Frind et al. | 219/121.52 |
| 4,908,492 | 3/1990 | Okamoto et al. | 219/121.52 |
| 5,144,110 | 9/1992 | Marantz et al. | 219/121.48 |
| 5,200,595 | 4/1993 | Boulos et al. | 219/121.52 |
| 5,225,656 | 7/1993 | Frind | 219/121.47 |
| 5,247,152 | 9/1993 | Blankenship | 219/121.49 |
| 5,357,075 | 10/1994 | Muehlberger | 219/121.47 |
| 5,408,066 | 4/1995 | Trapani et al. | 219/121.47 |

OTHER PUBLICATIONS

L. Bianchi, F. Blein, P. Lucchese, A. Grimaud, and P. Fauchais, "Comparison of Plasma Sprayed Alumina and Zirconia Coatings by RF and DC Plasma Spraying", 20–24 Jun. 1994, pp. 575–579, Proceedings of the 7th National Thermal Spray Conference, Boston, Massachusetts.

R. J. Wright, R. E. Anderson, Jr., and Z. R. Waltz, "Single-–Crystal Alumina/Aluminum Alloy Composite Structure Fabrication by RF–Coupled Plasma Spray Processing", Sep. 1994, pp. 292–294, *Journal of Thermal Spray Technology*, vol. 3 No. 3.

R. E. Anderson, Jr., R. J. Wright, T. M. Carleton, and R. G. Panse, "Metallurgical Characteristics of As–Deposited RF–Coupled Plasma–Sprayed Aluminum Alloys", Sep. 1994, pp. 289–291, *Journal of Thermal Spray Technology*, vol. 3 No. 3.

C. M. Hackett, G. S. Settles, and J. D. Miller, "On the Gas Dynamics of HVOF Thermal Sprays", Sep. 1994, pp. 299–304, *Journal of Thermal Spray Technology*, vol. 3 No. 3.

*Primary Examiner*—Mark H. Paschall
*Attorney, Agent, or Firm*—Richard D. Getz

[57] ABSTRACT

A thermal spray method and apparatus for applying a coating on to a substrate is provided comprising the steps of: (1) providing powder particles to be deposited on to the substrate; (2) providing a plasma spray apparatus for depositing the powder particles; (3) providing structure for preheating the powder particles prior to the particles entering the plume; (4) preheating the powder particles prior to entraining the particles within the plasma; and (5) depositing the molten powder particles on to the substrate.

1 Claim, 2 Drawing Sheets

THERMAL SPRAY COATING METHOD AND APPARATUS

The invention was made under a U.S. Government contract and the Government has rights herein.

BACKGROUND OF THE INVENTION

1. Technical Field

This invention applies to thermal spray coating equipment and methods in general, and to plasma spray coating equipment in particular.

2. Background Information

Thermally sprayed coatings may be applied by a variety of processes including conventional direct current (DC) plasma torches and radiofrequency (RF) plasma torches. The plasma generator of a conventional DC plasma torch generally includes a rod-like cathode located within a bore in the body portion of the torch which acts as the anode. An unreactive gas such as argon, an argon/helium mixture, or an argon/hydrogen mixture passes axially along the rod, between the rod and the body. The gas is excited into a plasma when an arc is initiated between the cathodic rod and the anodic body. The plasma extends a distance beyond the anode and cathode in what may be described as a plume. The coating material powder to be sprayed is fed into the plasma, where ideally all of the powder changes to a molten state prior to being deposited on a substrate.

The plasma generator of an RF plasma torch generally includes a plasma confinement tube surrounded by a multiple turn induction coil connected to a RF power supply, and a powder probe extending axially within the confinement tube. Gas fed into the confinement tube passes through magnetic fields created by the RF current passing through the coils of the induction coil. The magnetic fields provide energy sufficient to change the gas from a gaseous state to a plasma. The plasma, in turn, provides energy sufficient to change powder particles introduced into the plasma from a solid state to a molten state.

One of the most significant differences between conventional DC plasma spraying and RF plasma spraying is the speed at which the gas and particles pass through and exit the gun. For example, in "Comparison of Plasma Sprayed Alumina and Zirconia Coatings by RF and DC Plasma Spraying" (Proceedings of the 7th National Thermal Spray Conference, 20–24 Jun. 1994, ASM International 1994), Bianchi et al. report that achieved velocities for fused and crushed $Al_2O_3$ particles - 45+22 $\mu m$ vary in the following ranges: 30–60 m/s for RF plasma torches; 150–250 m/s for conventional DC plasma torches; and 250–400 m/s for HPHV torches. A person of skill will recognize that particle velocities depend on a number of variables including particle composition and size.

RF plasma torches are often employed in thermal coating applications where relatively slow spray velocities are desirable. Low spray velocities permit the particulate matter to dwell within the plasma plume longer than is possible using conventional high velocity plasma spray apparatus. One significant advantage of a longer dwell time is that larger, less expensive powder particles can be used; e.g., the powder particle size distribution for RF plasma spraying is generally between −80 and +140 mesh as compared to the −325 mesh typically used for conventional DC plasma spraying. Another advantage of the longer dwell time is that a greater portion of powder particles introduced into the plasma change to the desirable molten state. In some cases, the increase in efficiency provided by the lower velocity can permit lower power settings to be used. A disadvantage of using an RF plasma torch, on the other hand, is that the plasma stream extending out from the gun loses energy to the relatively cool surrounding environment. The energy loss causes some molten particles to resolidify prior to deposition on the substrate. The energy loss problem is exacerbated when smaller particles are used because of their tendency to loss energy more readily.

In short, what is needed is an apparatus and/or method for plasma spraying a coating on to a substrate that efficiently creates a plasma and one that deposits a high quality coating with minimal adverse effect on the substrate to be coated.

DISCLOSURE OF THE INVENTION

It is, therefore, an object of the present invention to provide a thermal spray method for depositing a coating on to a substrate that decreases contamination within the coating.

It is a further object of the present invention to provide a thermal spray method for depositing a coating on to a substrate that improves the deposition rate of the powder particles.

It is a still further object of the present invention to provide a thermal spray method for depositing a coating on to a substrate that permits the use of larger size powder particles.

It is a still further object of the present invention to provide a thermal spray method for depositing a coating on to a substrate that increases the density of the deposited coating.

According to the present invention, a thermal spray method for depositing a coating on to a substrate is provided comprising the steps of:

(1) providing powder particles to be deposited on to the substrate;

(2) providing a plasma generator, for selectively changing gas from a gaseous state to a plasma;

(3) providing means for preheating said powder particles prior to said particles entering said plasma;

(4) selectively changing said gas from gaseous state to plasma with said plasma generator;

(5) preheating said powder particles prior to entraining said particles within said plasma, using said means for preheating;

(6) entraining said powder particles into said plasma, wherein said plasma melts substantially all of said powder particles; and (7) depositing said melted powder particles on to the substrate.

According to one aspect of the present invention, a thermal spray apparatus is provided which includes a plasma generator, for selectively changing gas passed through the generator from a gaseous state to a plasma, and means for preheating powder particles prior to entrainment of the powder particles within the plasma. Thermal energy from the plasma transfers to a portion of the powder particles during entrainment and causes the powder particles to change from a solid state to a molten state. The means for preheating the powder particles increases the thermal energy of the powder particles prior to their entrainment within the plasma, thereby increasing the portion of the powder particles which change from solid state to molten state.

An advantage of the present invention is a decrease in the amount of contamination present in the deposited coating. Preheating the powder particles prior to entrainment within the plasma increases the number of particles that change from a solid state to a molten state. As a result, less solid and only partially melted particles are captured within the deposited coating.

Another advantage of the present invention is an increase in the powder deposition efficiency rate (i.e., the ratio of material fed into the plasma spray device compared to the portion which actually forms the coating). Preheating the powder particles prior to entrainment within the plasma increases the number of particles that change from a solid state to a molten state. As a result, for a given period of time more particles attach to the substrate to form the coating.

Still another advantage of the present invention is that the increased energy applied to the powder particles enables larger size powder particles to be used. A person of skill in the art will recognize that larger particles are less expensive to procure, decrease the interstitial levels within the coating, and are less apt to resolidify prior to deposition.

Still another advantage of the present invention is an increase in the density of the coating being applied to the substrate. Reducing the number of contaminants within the coating increases the density of the coating which in most cases gives the coating greater mechanical strength.

These and other objects, features and advantages of the present invention will become apparent in light of the detailed description of the best mode embodiment thereof, as illustrated in the accompanying drawings.

BEST MODE FOR CARRYING OUT THE INVENTION

Figure 1:
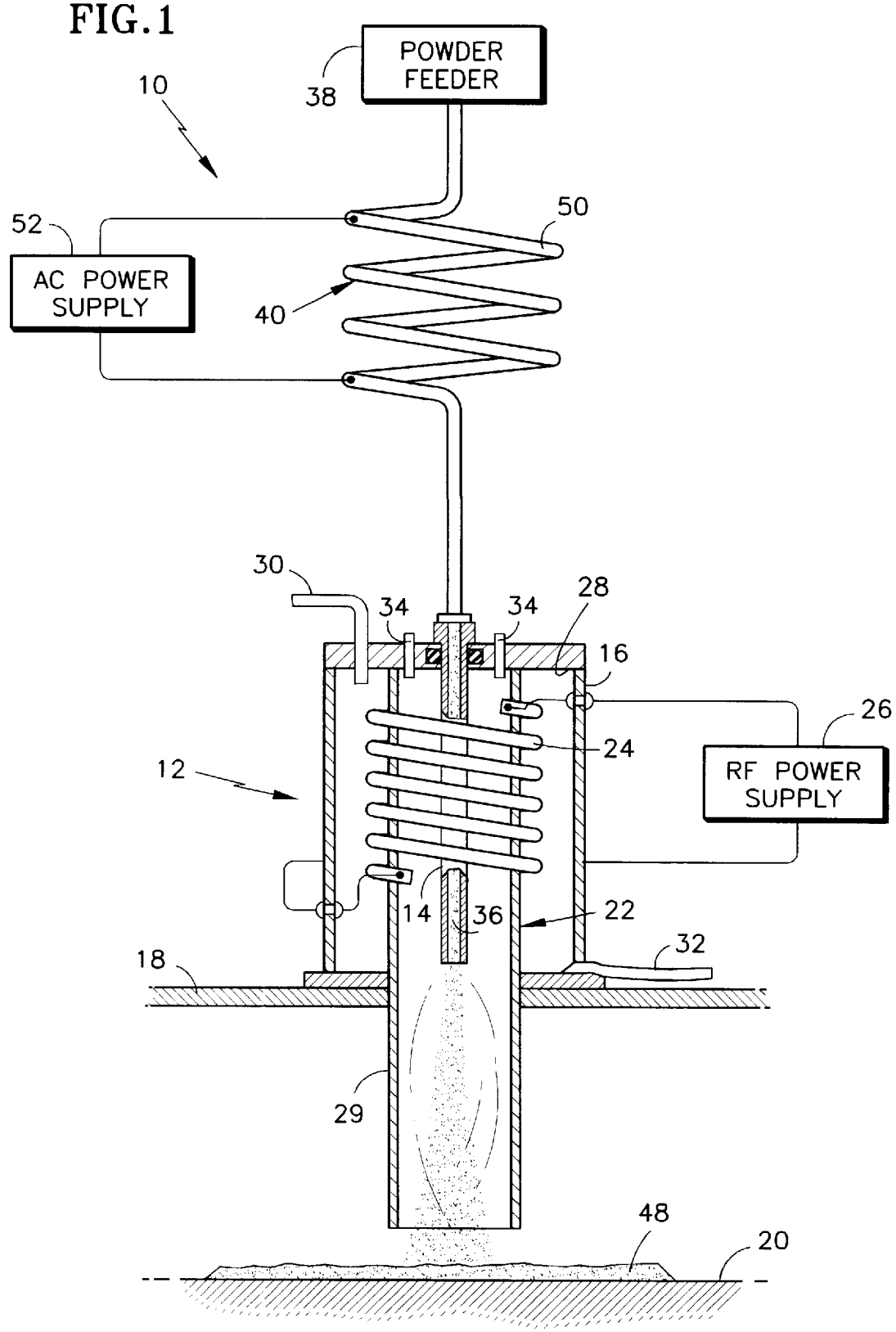
FIG. 1 is a diagrammatic view of the thermal spray apparatus including means for preheating the powder particles external to the thermal spray apparatus, and a nozzle attachment.

Referring to FIG. 1, a thermal spray apparatus 10 is shown having a plasma generator 12 and a powder probe 14 disposed within a coolant housing 16. The apparatus 10 is attached to a control vessel 18 which contains a substrate 20 to be coated. Depending upon the application, the control vessel 18 may be evacuated to a pressure lower than atmospheric.

Figure 2:
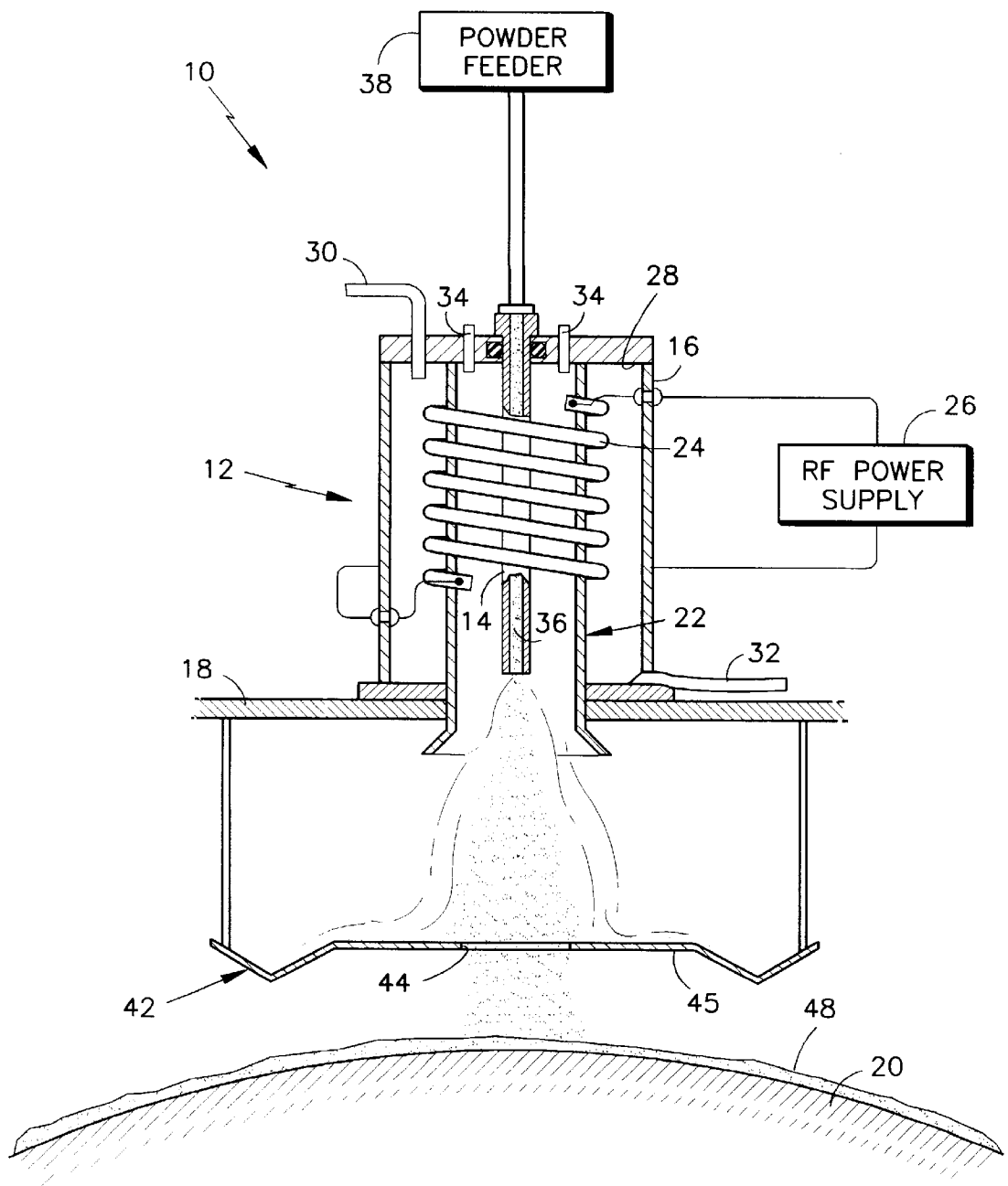
FIG. 2 is a diagrammatic view of a thermal spray apparatus including means for filtering the plasma.

The plasma generator 12 includes a confinement tube 22 and a multiple turn inductive coil 24. The inductive coil 24 is disposed around the confinement tube 22 and is electrically connected to a radiofrequency (RF) power supply 26. The RF power supply 26 provides an alternating current having an adjustable frequency and magnitude which creates high intensity alternating magnetic fields within the confinement tube 22. In FIG. 1, the confinement tube 22 begins at the top 28 of the coolant housing 16, and includes an extension 29 which extends a distance into the control vessel 18, ending adjacent the substrate 20. The extension may also be called a nozzle. In FIG. 2, the confinement tube 22 begins at the top 28 of the coolant housing 16 and extends just inside the control vessel 18 before tapering radially outward and ending. The coolant housing 16 includes a cooling inlet 30 and outlet 32, and a plurality of plasma gas ports 34 disposed around the periphery of the powder probe 14. The plasma gas ports 34 are connected to a plasma gas source (not shown).

The powder probe 14 is cylindrically shaped and includes a center bore 36 for the passage of powder particles. The diameter of the center bore 36 is selected to accommodate the size of the powder particle being sprayed. In the preferred embodiment, the powder probe 14 consists of a ceramic such as alumina. Other insulative materials may be used including, but not limited to, refractory materials. The powder probe 14 is connected to a powder feeder 38 that can be adjusted to provide powder particles at a variety of flow rates. In a first embodiment shown in FIG. 1, a heat exchanger 40 is disposed between the powder feeder 38 and the thermal spray apparatus 10.

Referring to FIG. 2, a plasma filter 42 is disposed adjacent the substrate 20 to be coated. The plasma filter 42 includes an aperture 44 disposed in a body 45. The aperture 44 is aligned with the plasma extending out from the thermal spray apparatus 10. The cross-sectional area and geometry (circular, elliptical, etc.) of the aperture 44 are chosen to allow only the high intensity region of the plasma through to the substrate 20. The high intensity region of the plasma may be defined as that region of the plasma which contains a higher average temperature and through which the flow rate of molten powder particles is greatest. The body 45 extends out around the aperture 44 sufficiently to prevent the remainder of the plasma from accessing the substrate 20. In the embodiment shown in FIG. 2, the plasma filter 42 is formed to collect the powder particles not applied.

In the operation of the thermal spray apparatus 10, the RF power supply 26 provides current which passes through the inductive coil 24. The current passing through the inductive coil 24, in turn, generates significant alternating magnetic fields within the confinement tube 22. Coolant cycled through the coolant housing 16 via the coolant inlet 30 and outlet 32 maintains the inductive coil 24 and confinement tube 22 at acceptable temperatures. An unreactive gas including, but not limited to, argon, helium, hydrogen, or mixtures thereof, is injected into the confinement tube 22 around the periphery of the powder probe 14 via the plasma gas ports 34. The gas passes through the annulus between the powder probe 14 and the confinement tube 22 and is subjected to the magnetic fields emanating from the inductive coil 24. The alternating magnetic fields transfer energy to the gas, causing the gas to change from a gaseous state to a plasma. Powder particles and a carrier gas propelling the particles through the powder probe 14 exit the powder probe 14 and become entrained within the plasma. The plasma transfers energy to the powder particles, causing the particles to change from a solid state to a molten state. The molten particles subsequently deposit on the substrate 20 and collectively form a coating 48.

To increase the powder deposition efficiency rate of the thermal spray apparatus 10, the present invention preheats the powder particles prior to entrainment within the plasma. In a first embodiment, the powder probe 14 provides a means for preheating the powder particles prior entrainment within the plasma. In a second embodiment, the heat exchanger 40 disposed between the powder feeder 38 and the thermal spray apparatus 10 provides a means for preheating the powder particles prior entrainment within the plasma. Both embodiments may be used independently or together for preheating purposes, depending upon the application and the plasma generator used.

The thermal environment within the confinement tube 22 is one of extreme temperature after a plasma has been induced. Powder particles exposed to thermal energy of that magnitude will completely or partially change state from solid to molten. A powder probe 14 consisting of a thermally conductive material such as tungsten can have powder particles changing state within the center bore 36 of the powder probe 14. Molten particles within the center bore 36 are undesirable because they increase the likelihood of clogging within the bore 36. The powder probe 14 of the present invention, on the other hand, consists of a thermally insulative material such as alumina. The insulative material limits the amount of thermal energy passing through the powder probe 14 and into the powder particles. As a result, the powder particles are preheated within the powder probe 14, but not enough to change from solid state to molten state. The amount of preheating accomplished within the powder probe 14 can be adjusted by manipulating variables including, but not limited to: (1) particle dwell time within the powder probe 14, which can be varied by changing the length of the probe 14 or the speed at which the particles pass through the probe 14; (2) thermal resistivity of the powder probe 14; and (3) the geometry of the probe 14, including the wall thickness.

FIG. 1 shows the heat exchanger 40 of the second embodiment as a resistive coil 50 electrically connected to an AC power supply 52. Current passing through the resistive coil 50 causes the resistive coil 50 to dissipate thermal energy which is transferred to the powder particles passing through the resistive coil 50. Heat exchangers employing thermal energy from a source other than electrical resistance may be used alternatively. An advantage of using an external heat exchanger 40 is that energy can be imparted to the powder prior to its entering the powder probe 14 and again while the powder is within the probe 14. This is a significant advantage for coatings that have constituent materials with high melting points. Another advantage is that the thermal input of an external heat exchanger 40 can be readily tailored, or selectively used for different applications, thereby increasing the versatility of the thermal spray apparatus 10.

Confining the plasma and the entrained powder within an extension 29 of the confinement tube increases the dwell time of the powder in the plasma. As a result, more thermal energy is delivered. There are applications, however, where a plasma filter 42 (shown in FIG. 2) is desirable in place of a confinement tube extension 29. A person of skill will recognize that there are differences in heat magnitude and distribution of molten particles across a cross-section of the plasma. Typically, the center region of the plasma (i.e., the high intensity region) contains the most dense distribution of entrained molten particles and the highest temperatures. Outside the center region, lower temperatures increase the percentage of particles which are either completely or partially solid and may compromise the mechanical properties of the coating 48. The plasma filter 42 permits only the center region of the plasma to pass through to the substrate 20. In addition, the plasma filter 42 is less susceptible to clogging than a confinement tube extension 29.

Although this invention has been shown and described with respect to the detailed embodiments thereof, it will be understood by those skilled in the art that various changes in form and detail thereof may be made without departing from the spirit and the scope of the invention. For example, the best mode discloses that a plasma spray filter and an external means for preheating powder particles prior to entrainment within the plasma may be used with an RF plasma generator. Alternatively, a plasma filter 42 and an external means for preheating powder particles prior to entrainment within the plasma may be used with other plasma generators including, but limited to, conventional DC arc-type apparatus.

We claim:

1. A plasma spray apparatus for coating a substrate, comprising:

a plasma generator, for selectively changing gas passed through said generator from a gaseous state to a plasma, having a confinement tube for confining said plasma, and a ceramic powder probe extending a distance into said confinement tube, said powder probe having an aperture for the passage of powder particles;

wherein said ceramic powder probe permits an amount of thermal energy from said plasma to transfer to said powder particles within said probe, less than that required to change said powder particles to a molten state, prior to said powder particles exiting said probe and being entrained within said plasma;

wherein thermal energy from said plasma within said confinement tube transfers to a portion of said entrained powder particles and causes said powder particles to change to a molten state.

* * * * *